United States Patent
Cooper et al.

(10) Patent No.: US 12,365,250 B2
(45) Date of Patent: Jul. 22, 2025

(54) RESISTIVE GRID SYSTEMS

(71) Applicant: Transportation IP Holdings, LLC, Norwalk, CT (US)

(72) Inventors: Laura Cooper, Erie, PA (US); Theodore Brown, Erie, PA (US); Jeffrey John Wolff, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 794 days.

(21) Appl. No.: 17/554,298

(22) Filed: Dec. 17, 2021

(65) Prior Publication Data

US 2022/0203839 A1  Jun. 30, 2022

Related U.S. Application Data

(60) Provisional application No. 63/132,969, filed on Dec. 31, 2020.

(51) Int. Cl.
*B60L 7/02* (2006.01)
*H01C 1/082* (2006.01)
*H01C 3/10* (2006.01)

(52) U.S. Cl.
CPC ............... *B60L 7/02* (2013.01); *H01C 1/082* (2013.01); *H01C 3/10* (2013.01); *B60L 2200/26* (2013.01)

(58) Field of Classification Search
CPC .. H01C 1/082; H01C 3/10; G60L 7/02; G60L 2200/26
See application file for complete search history.

(56) References Cited

U.S. PATENT DOCUMENTS

| | | | | |
|---|---|---|---|---|
| 1,505,072 A * | 8/1924 | Walmsley | ................. | H01C 3/10 338/217 |
| 2,128,222 A * | 8/1938 | Marvin | ..................... | H01C 3/10 338/288 |
| 2,868,937 A * | 1/1959 | Charbonneau | ........... | H01C 3/10 338/319 |
| 4,051,452 A * | 9/1977 | Luy | .......................... | H01C 1/08 338/319 |

(Continued)

FOREIGN PATENT DOCUMENTS

| DE | 202013010291 U1 | 2/2014 |
|---|---|---|
| KR | 101873353 B1 | 8/2018 |

OTHER PUBLICATIONS

Extended European Search Report mailed May 20, 2022 for corresponding EP Patent Application No. 21216545.0 (11 pages).

(Continued)

*Primary Examiner* — Kyung S Lee
(74) *Attorney, Agent, or Firm* — K&L Gates LLP

(57) ABSTRACT

A resistive grid includes a frame and at least one resistive element. The frame has a first frame end and a second frame end opposite the first frame end. The first frame end and the second frame end are joined by frame sides. The first frame end has a first length that is shorter than a second length of the second frame end. The at least one resistive element extends between the first frame end and the second frame end. The at least one resistive element has a first portion proximate the first frame end, and a second portion proximate the second frame end. The first portion is configured to have one or both of decreased heat generation or decreased electrical resistance relative to the second portion.

18 Claims, 12 Drawing Sheets

(56) References Cited

U.S. PATENT DOCUMENTS

| | | | | |
|---|---|---|---|---|
| 4,316,172 A | * | 2/1982 | Luy | H01C 1/014 338/315 |
| 4,359,710 A | | 11/1982 | Luy | |
| 4,630,024 A | * | 12/1986 | Allen | H01C 3/10 338/293 |
| 4,654,627 A | | 3/1987 | Harkness | |
| 4,847,585 A | * | 7/1989 | Kirilloff | H01C 3/10 338/58 |
| 5,159,310 A | * | 10/1992 | Cummins | H01C 1/08 338/290 |
| 5,221,917 A | | 6/1993 | Cummins | |
| 5,304,978 A | | 4/1994 | Cummins et al. | |
| 5,917,404 A | | 6/1999 | Campbell | |
| 6,081,183 A | * | 6/2000 | Mading | H01C 3/12 338/319 |
| 10,665,369 B1 | | 5/2020 | Rao et al. | |
| 2004/0095224 A1 | | 5/2004 | Ekwall | |
| 2013/0154523 A1 | | 6/2013 | Brown et al. | |

OTHER PUBLICATIONS

Office Action mailed Jul. 5, 2023 for corresponding Japanese Patent Application No. 2021-206318 (5 pages).

* cited by examiner

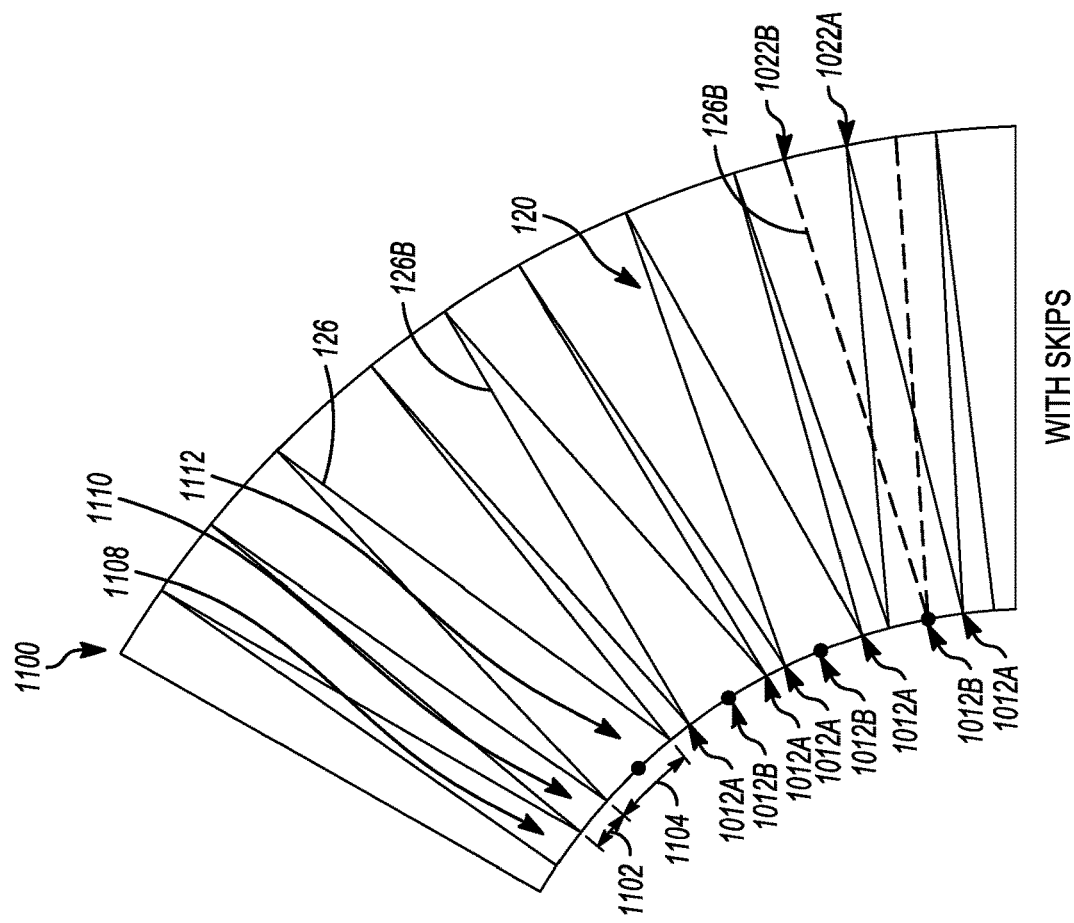
FIG. 11 WITH SKIPS
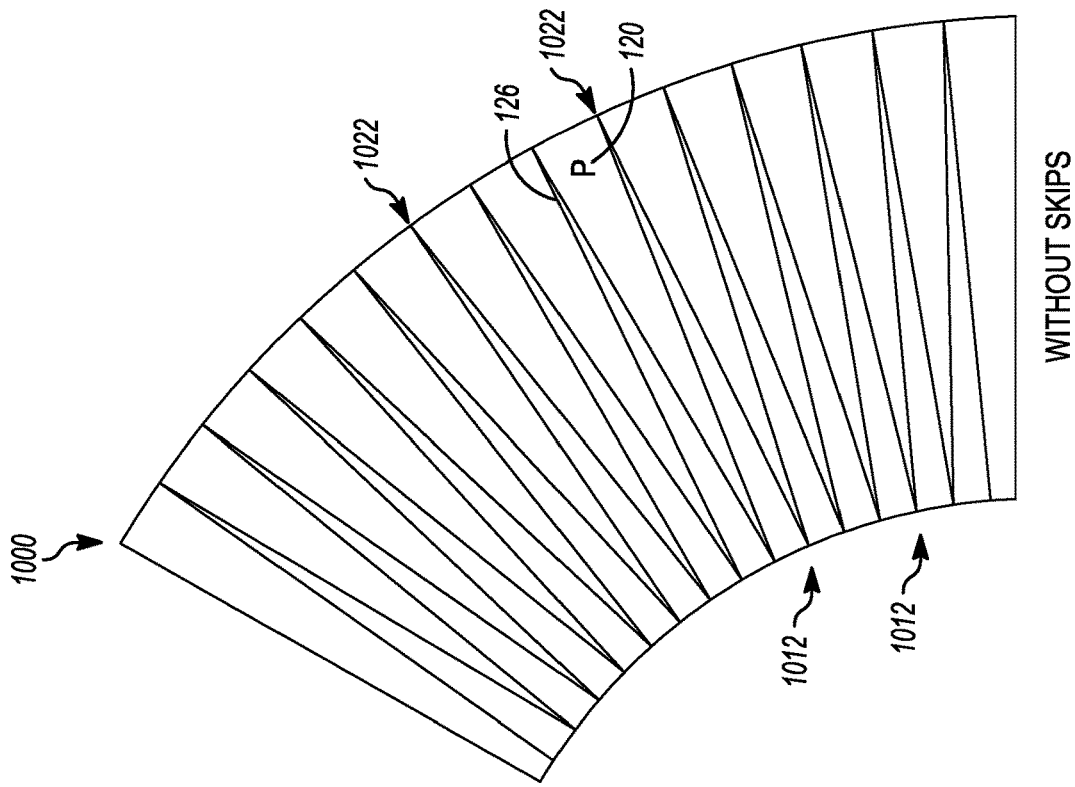
FIG. 10 WITHOUT SKIPS

RESISTIVE GRID SYSTEMS

CROSS-REFERENCE TO RELATED APPLICATIONS

This application claims priority to U.S. Provisional Application Ser. No. 63/132,969, entitled "Resistive Grid Systems" (filed Dec. 31, 2020) the entire disclosure of which is incorporated by reference.

BACKGROUND

Technical Field

The subject matter described relates to resistive grid systems, for example in connection with dynamic braking of a vehicle.

Discussion of Art

Electric power may be dissipated using grid assemblies in order to provide dynamic braking of a vehicle, such as a rail vehicle. A number of similar resistive elements may be supported by a frame and cooled using a blower. Various geometries may be used for different resistive grids. For example, a radially shaped grid or a square grid may be used. For a radially shaped grid, when each individual resistive element or portion is supported at both an inner radius and an outer radius, the elements or portions become more densely packed at the inner radius, resulting in more power and heat being concentrated toward the inner radius. It may be desirable to have grid assemblies that differ from those that are currently available.

BRIEF DESCRIPTION

In accordance with one example or aspect, a resistive grid may include a frame and at least one resistive element. The frame may have a first frame end and a second frame end opposite the first frame end. The first frame end and the second frame end may be joined by frame sides. The at least one resistive element may extend between the first frame end and the second frame end. The at least one resistive element may have a first portion and a second portion. The first portion may be configured to have one or both of decreased heat generation or decreased electrical resistance relative to the second portion.

In accordance with one example or aspect, a resistive grid may include a frame and a plurality of resistive plates. The frame may have a first frame end and a second frame end opposite the first frame end. The first frame end and the second frame end may be joined by frame sides. The first frame end may have a first length that is shorter than a second length of the second frame end. The plurality of resistive plates may extend between the first frame end and the second frame end. The resistive plates may have a first plate end proximate to the first frame end, and a second plate end proximate to the second frame end. The first plate end may be configured to have one or both of decreased heat generation or decreased electrical resistance relative to the second plate end.

In accordance with one example or aspect, a resistive grid system may include a first resistive grid that includes a first frame and at least one first resistive element. The first frame may have a first frame end and a second frame end opposite the first frame end. The first frame end and the second frame end may be joined by frame sides. The first frame end may have a first length that is shorter than a second length of the second frame end. The at least one first resistive element may extend between the first frame end and the second frame end. The at least one first resistive element may have a first portion proximate the first frame end, and a second portion proximate the second frame end. The at least one first resistive element may define portions that are unevenly spaced along the first frame end.

BRIEF DESCRIPTION OF THE DRAWINGS

The inventive subject matter may be understood from reading the following description of non-limiting embodiments, with reference to the attached drawings, wherein below:

FIG. 10 provides a top view of a resistive grid;

FIG. 11 provides a top view of resistive grid having uneven spacing;

FIG. 17b provides a schematic view of airflow for a first portion of the resistive element of FIG. 17a;

FIG. 17c provides a schematic view of airflow for a second portion of the resistive element of FIG. 17a.

DETAILED DESCRIPTION

Embodiments of the subject matter described herein relate to systems for resistive grids (e.g., for use with dynamic braking of a vehicle). Various embodiments provide for redistribution of power or heat more equally across a resistive grid. Further, various embodiments provide for redistribution of power transfer or heat dissipation toward an outer radius of a grid where velocity of air provided by certain blowers may be relatively higher. Various embodiments provide for improved heat transfer from resistive elements to reduce operating temperatures at beneficial locations relative to other designs.

While various examples herein may be discussed in connection with rail vehicles, not all embodiments described herein are limited to rail vehicle systems. For example, one or more embodiments of the systems and methods described herein can be used in connection with other types of vehicles, such as automobiles, trucks, buses, mining vehicles, marine vessels, aircraft, agricultural vehicles, and the like. In some embodiments, such vehicles may be gas-powered, diesel-powered, electric-powered, or powered via other appropriate propulsion systems, including hybrid systems that include multiple systems for powering the vehicles. In other embodiments, the systems and methods described herein may be utilized in connection with non-vehicular systems. One example may be wind turbines when excess electricity is produced or to balance load demands in a grid system. In some embodiments, the resistive grid may be used in conjunction with an energy storage device. In such an instance, some of the dynamic braking energy may be directed to the energy storage device while other amounts of the energy are directed to the resistive grid.

Figure 1:
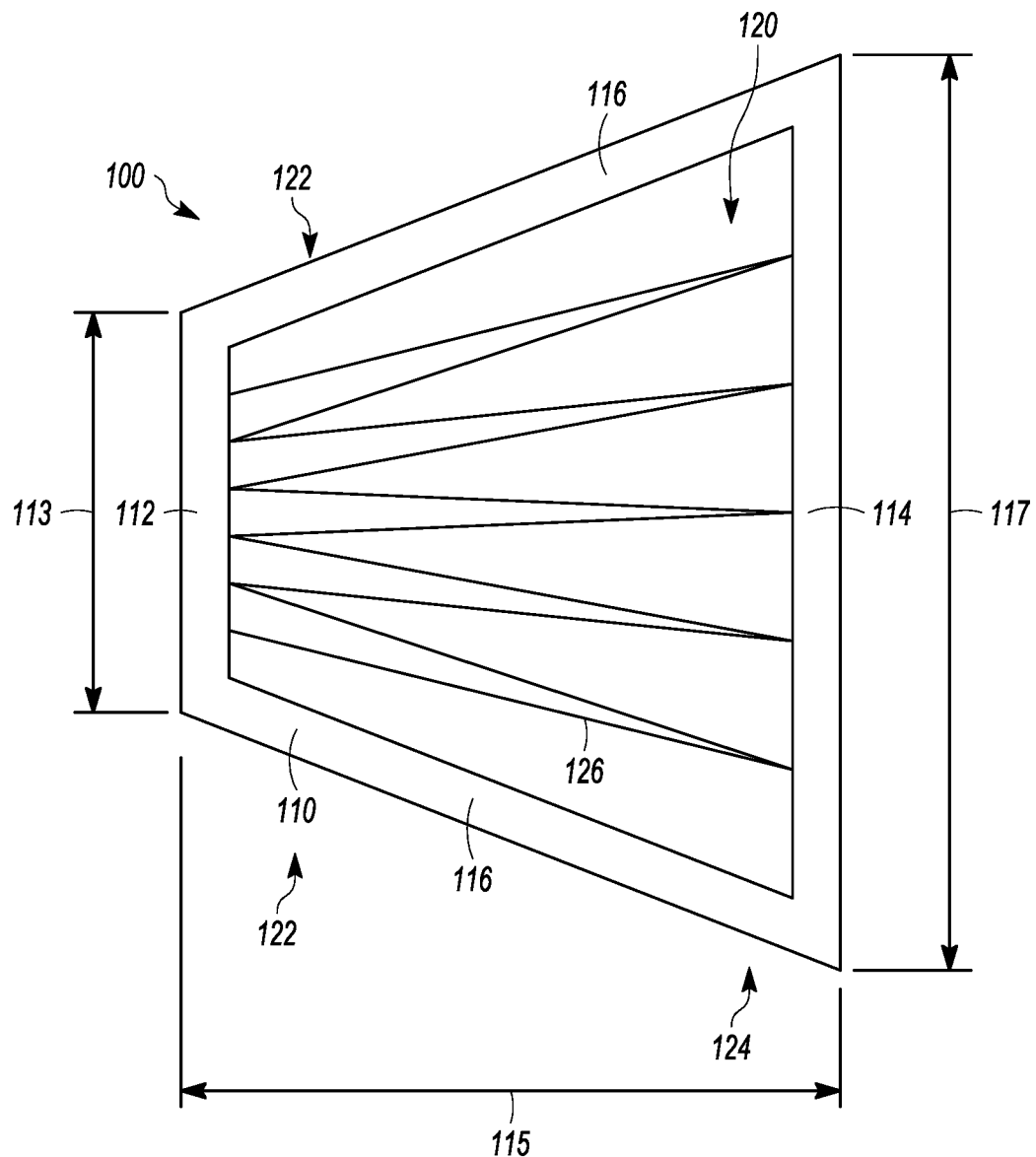
FIG. 1 illustrates a block schematic diagram of a resistive grid.

FIG. 1 illustrates a schematic diagram of a resistive grid 100. The resistive grid in various embodiments may be used with additional similar resistive grids in connection with dynamic braking of a vehicle. The depicted resistive grid includes a frame 110 and at least one resistive element 120. The frame may support the at least one resistive element, with the at least one resistive element that can receive a current passed through the at least one resistive element to dissipate power. For example, the at least one resistive element may be heated due to the current passing therethrough, with a blower (not shown) used to circulate air over and/or past the at least one resistive element to dissipate the generated heat.

As seen in FIG. 1, the depicted frame includes a first frame end 112 and a second frame end 114. The second frame end is opposite the first frame end. The first frame end and the second frame end are joined by frame sides 116. The frame ends and frame sides are joined to define the perimeter of the frame, with the at least one resistive element disposed in an interior of a volume defined by the perimeter of the frame.

The first frame end and the second frame end are differently sized. Specifically, as seen in FIG. 1, the first frame end has a first length 113, and the second frame end has a second length 117, with the first length (the length of the first frame end) being shorter than the second length (the length of the second frame end).

Figure 2:
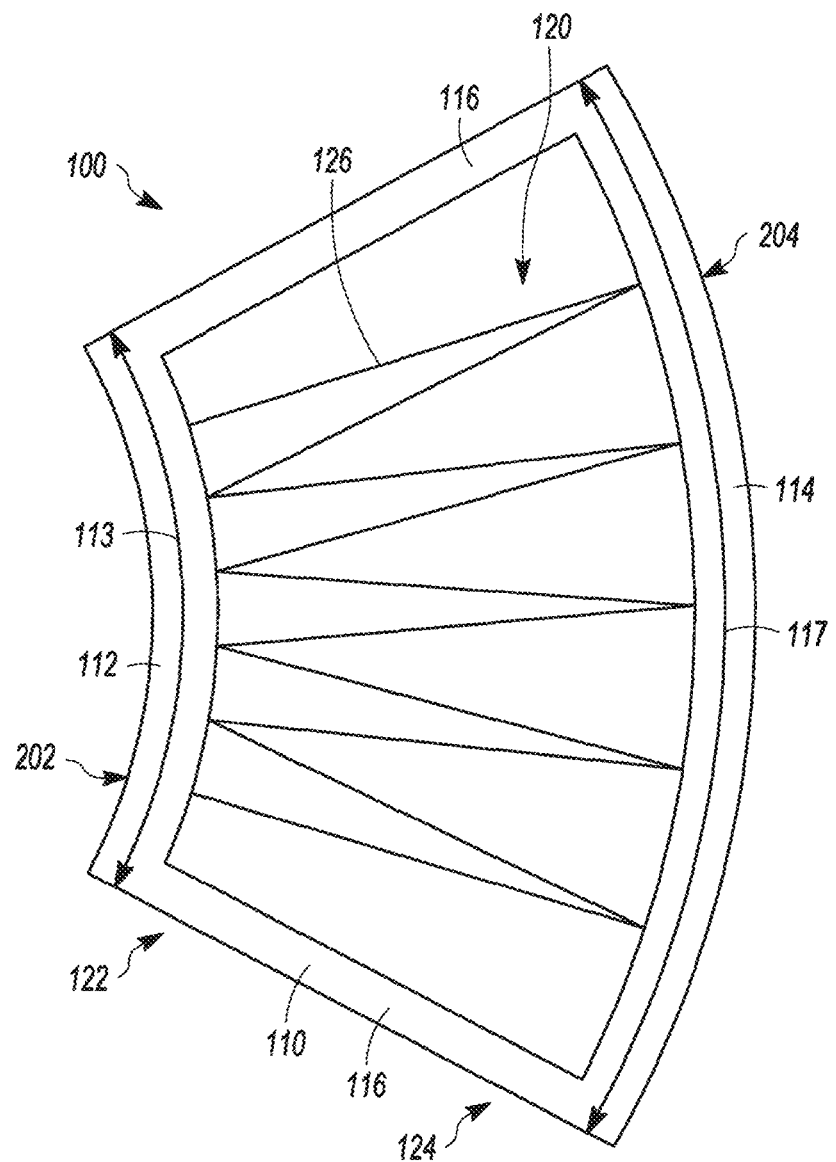
FIG. 2 provides a block schematic diagram of another resistive grid.

Different shapes of grids may be utilized in various embodiments. For example, FIG. 2 illustrates a schematic diagram of an example of the resistive grid in which the first frame end defines an inner radius 202, and the second frame end defines an outer radius 204. The outer radius 204 is larger than the inner radius 202, with the first length 113 (which is along the inner radius 202) accordingly being shorter than the second length 117 (which is along the outer radius 204) for the example resistive grid depicted in FIG. 2.

Some resistive grids may be combined with other resistive grids to provide a desired shape. For example, the resistive grid depicted in FIG. 1 having straight frame ends may be used with other similar resistive grids to provide a group of grids having a shape of a polygon. As another example, the resistive grid of FIG. 200 defining inner and outer radii may be used with other similar resistive grids to provide a group of grids having a shape of ring.

With continued reference to FIGS. 1 and 2, the depicted at least one resistive element may represent a single resistive element, for example, a continuous ribbon 126 as shown in FIGS. 1 and 2. In other embodiments, the resistive element may itself represent a group of resistive elements, for example, a group of individual resistive plates. (See, e.g., FIGS. 3-9 and related discussion.) In some embodiments the resistive elements may be made of the same material. In other embodiments, not shown, the resistive elements may not made of the same material but rather may be made of materials with thermal, mechanical and/or electrical properties that differ from each other. Further, thickness and surface profile and finish may differ from resistive element to resistive element in some embodiments.

The resistive element may extend in parallel to the frame sides 116, and perpendicular or tangent to the frame ends in one embodiment. As seen in FIGS. 1 and 2, the depicted resistive element extends between the first frame end and the second frame end. The resistive element includes a first portion 122 and a second portion 124. The first portion 122 of the resistive element is disposed proximate or oriented toward the first frame end, and the second portion 124 of the resistive element is disposed proximate or oriented toward the second frame end. The first portion 122 may have one or both of decreased heat generation or decreased electrical resistance relative to the second portion 124. Accordingly, heat and/or power that otherwise would tend to concentrate in the more densely packed region around the first portion 122 and first frame end is redistributed toward the second portion 124 and second frame end. Various techniques may be used to achieve the redistribution, including relative sizing of the first portion 122 relative to the second portion 124, spacing between resistive elements or portions thereof along the first frame end, the use of openings, and/or the use of other features. In various embodiments, the resistive element may be extruded or 3D printed to provide flexibility in available shapes and configurations.

It may be noted that while increasing heat or power dissipation at a given frame end is discussed herein in connection with various embodiments, other embodiments may be configured to increase heat or power dissipation at other parts of a resistive grid. For example, by increasing the heat or power dissipation at the center of a resistive grid, relatively high temperatures may be utilized at the center and lower temperatures may be used at frame ends. Resistive elements in various embodiments have a relatively high thermal capability relative to supporting insulators used to mount the elements to the frame. Accordingly, by forcing hotter element portions to the middle and away from the insulators, higher temperatures may be used. It may further be noted that while the first and second frame ends of FIGS. 1 and 2 are shown as differently sized (with the first frame end having a shorter length), in other embodiments the first and second frame ends may have the same length (e.g., for a square or rectangular shaped frame).

Figure 3:
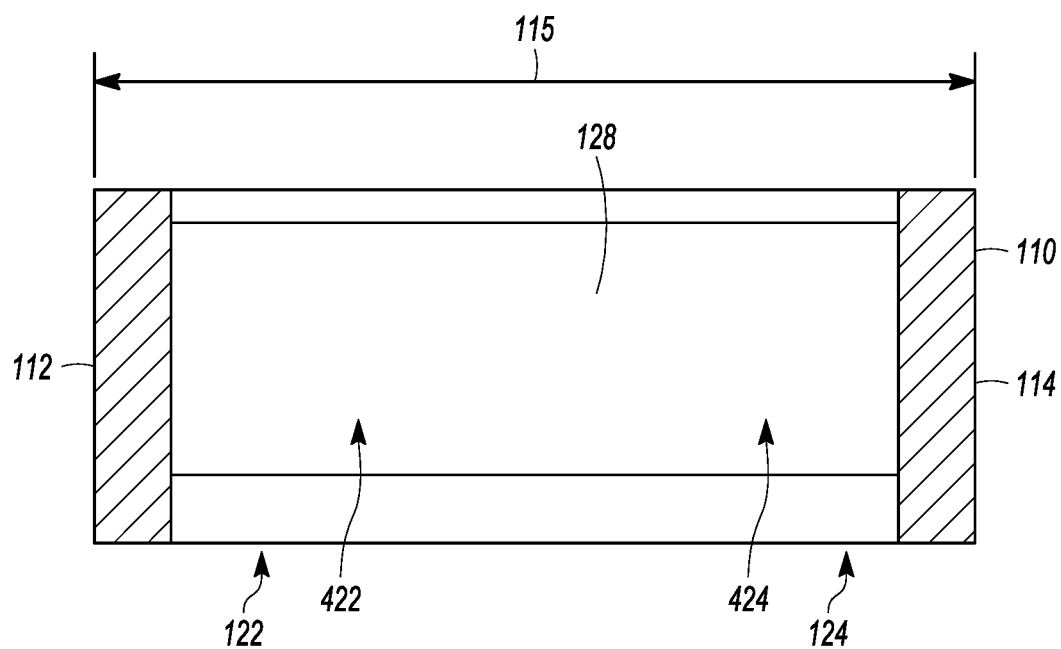
FIG. 3 provides a side sectional view of a resistive grid.
Figure 4:
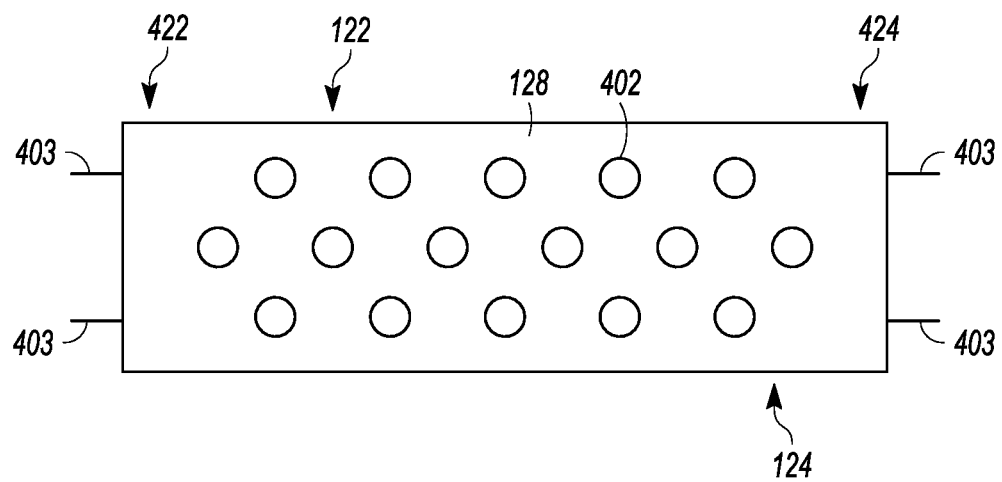
FIG. 4 provides a side view of a resistive plate.

FIG. 3 provides a side sectional view of an example resistive grid that uses individual resistive plates. As seen in FIG. 3, the depicted resistive grid includes a resistive plate 128 that extends from the first frame end to the second frame end. The resistive plate has a first plate end 422 that is proximate to or oriented toward the first frame end, and represents or corresponds to the first portion 122 of the at least one resistive element. The resistive plate also has a second plate end 424 that is proximate to or oriented toward the second frame end, and represents or corresponds to the second portion 124 of the at least one resistive element. One or more connectors 403 (see, e.g., FIG. 4) may be used to mechanically and/or electrically couple the resistive plate to the frame ends. In some embodiments, the resistive plate is solid, continuous and flat (e.g., devoid of holes passing therethrough or features extending therefrom). In other embodiments, the resistive plate has apertures or holes, protrusions, and/or other surface features. For example, FIG. 4 depicts a side view an example resistive plate that has inner surfaces that define a plurality of holes 402 that pass through the resistive plate (e.g., through a thickness of the resistive plate). The holes may provide increased air circulation (and cooling) over part or all of the resistive plate, may reduce weight, may direct or steer air flow, and/or may reduce pressure drop across the air flow path. Further, holes and/or raised features may be employed to add turbulence and increase the Reynolds number for air flow over at least a portion of a resistive element, with the increased Reynolds number providing increased heat transfer.

Figure 5:
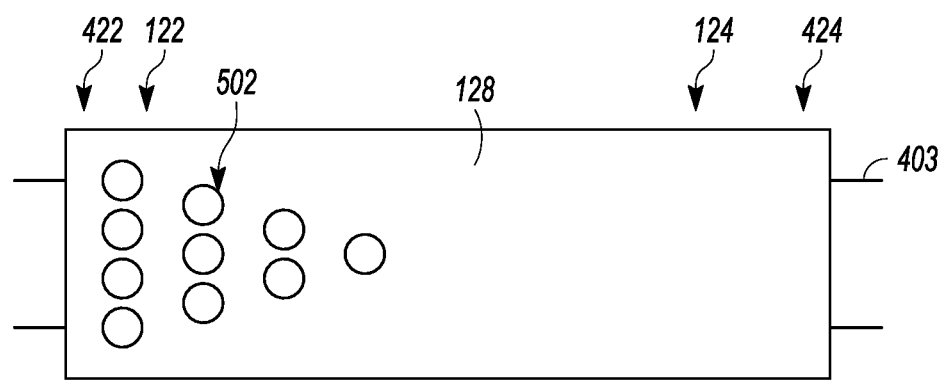
FIG. 5 provides a side view of another resistive plate.

One or more holes may be located such that they can provide increased circulation and cooling for the first plate end 422 (or first portion 122) relative to the second plate end 424 (or second portion 124). FIG. 5 provides a side view of an example resistive plate including holes 502. As seen in FIG. 5, the depicted example holes 502 are disposed toward the first plate end 422 but not toward the second plate end 424. Accordingly, the holes 502 provide increased air circulation and cooling at or near the first plate end 422 (or first portion 122) relative to the second plate end 424 (or second portion 124). Further, the holes 502 are more concentrated or densely packed closer to the first plate end 422, providing for increased circulation closer to the first plate end 422. Accordingly, for example, the first plate end may be positioned in an area with lower air flow than the second plate end, with the holes providing increased cooling toward the first plate end for improved thermal balance.

The relative sizes of the first plate end 422 (or first portion 122) and the second plate end 424 (or second portion 124) may be used additionally or alternatively to redistribute power or heat. For example, by providing a larger area for the first portion 122 relative to the second portion 124, the first portion 122 may have a reduced power dissipation per area and accordingly lower temperature, and/or have a greater surface area to improve cooling by air circulation, relative to the second portion 124. Further, with the second portion having a reduced cross-section, the second portion has a higher resistance and accordingly more power is directed to the second portion relative to the first portion. Accordingly, the second portion may be positioned in areas having higher air flow (and the first portion positioned in areas having lower air flow), with power accordingly directed to areas of higher air flow to improve power dissipation. For example, more power can be directed to locations having greater air flow where it is easier to dissipate power. It may be noted that cross-section may be additionally or alternatively varied using variable depths or thicknesses for a resistive plate. Accordingly, by varying the width and/or thickness of a resistive plate to increase resistance and power in areas that experience higher air flow (and/or other cooling), power may be distributed along the resistive plate to improve thermal balance and power dissipation. In various embodiments, graduated or tapered element cross sections may be utilized to reduce power in areas of low airflow and to increase power in areas of higher airflow. Additionally, cross-section may be increased for locations in close proximity to the ends to lower adjacent insulation temperatures.

Figure 6:
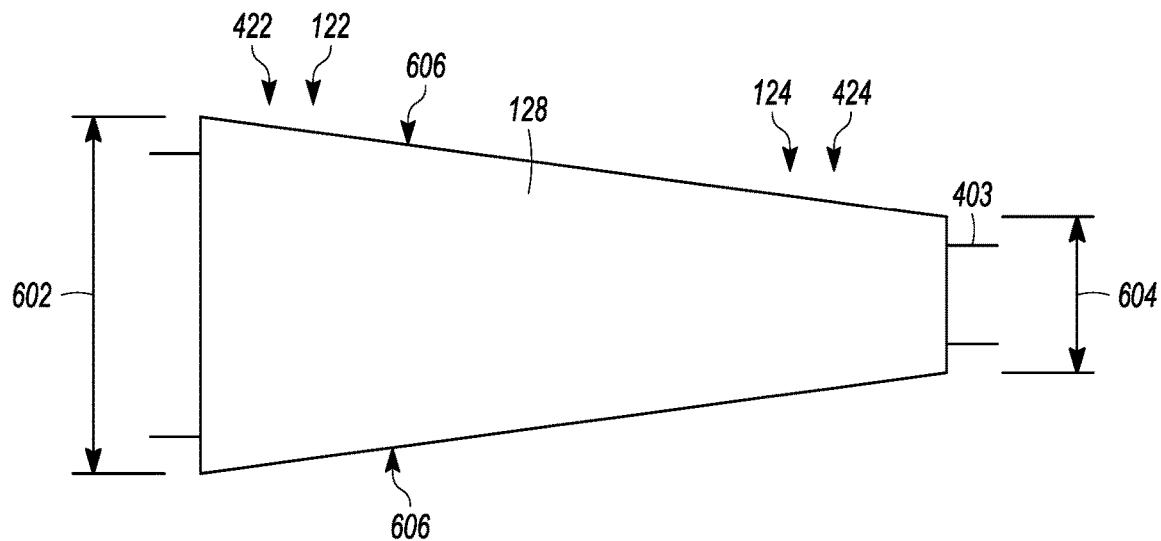
FIG. 6 provides a side view of another resistive plate.

For example, FIG. 6 depicts a side view of an example resistive plate. For the example of FIG. 6, the first plate end 422 has a first width 602, and the second plate end 424 has a second width 604 that is smaller than the first width 602. Accordingly, the second portion has increased resistance relative to the first portion. Further, the second portion may be positioned in a location of greater airflow relative to the first portion, and an increased amount of power or heat can be redistributed toward the second portion relative to a design in which both plate ends are evenly sized.

The example resistive plate depicted in FIG. 6 includes tapered sides 606 that extend between the first plate end 422 and the second plate end 424. A tapered side, as used herein, may extend at an oblique angle to, from, or relative to a plate end in various embodiments.

Figure 7:
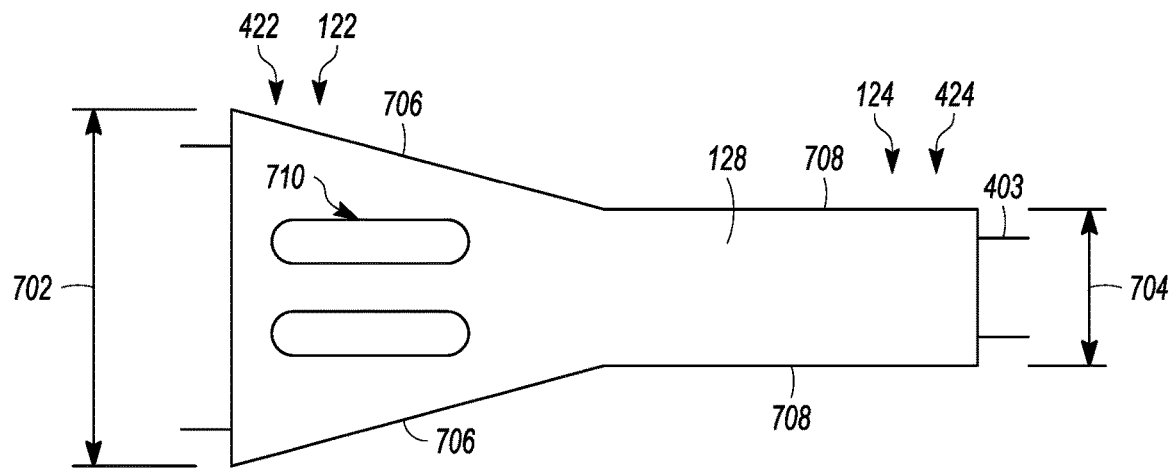
FIG. 7 provides a side view of another resistive plate.

Other forms of tapers may be used in alternate embodiments. For example, FIG. 7 depicts a side view of an example resistive plate. For the example of FIG. 7, the first plate end 422 has a first width 702, and the second plate end 424 has a second width 704 that is smaller than the first width 702. Accordingly, the second portion has increased resistance relative to the first portion. Further, the second portion may be positioned in a location of greater airflow relative to the first portion, and an increased amount of power or heat can be redistributed toward the second portion relative to a design in which both plate ends are evenly sized. The example of FIG. 7 does not have a tapered side extending the entire length of the resistive plate, however. Instead, the example resistive plate of FIG. 7 includes a tapered side 706 that extends partially along a length of the resistive plate to a straight side 708 that extends from the second plate end 424. The example resistive plate of FIG. 7 also includes slots 710 that pass through the thickness of the resistive plate. The slots in the illustrated example are located proximate the first plate end or first portion and provide increased cooling via air circulation for the first portion. Slots may be included alternatively or additionally at other locations of the resistive plate in other embodiments.

Figure 8:
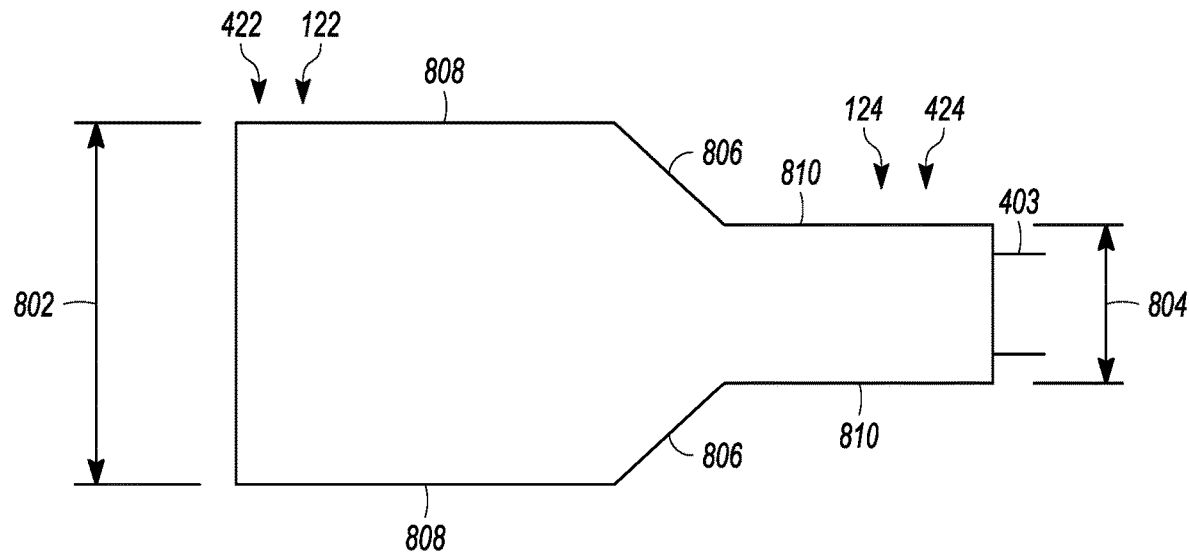
FIG. 8 provides a side view of another resistive plate.

FIG. 8 depicts a side view of an example resistive plate illustrating another variation of tapered sides. For the example of FIG. 8, the first plate end 422 has a first width 802, and the second plate end 424 has a second width 804 that is smaller than the first width 802. Again, the second portion has increased resistance relative to the first portion. Further, the second portion may be positioned in a location of greater airflow relative to the first portion, and an increased amount of power or heat can be redistributed toward the second portion relative to a design in which both plate ends are evenly sized. The example of FIG. 8 includes first straight sides 808 extending from the first plate end 422, and second straight sides 810 extending from the second plate end 424. The first straight sides 808 and second straight sides 810 are joined by corresponding intermediate tapered sides 806.

Figure 9:
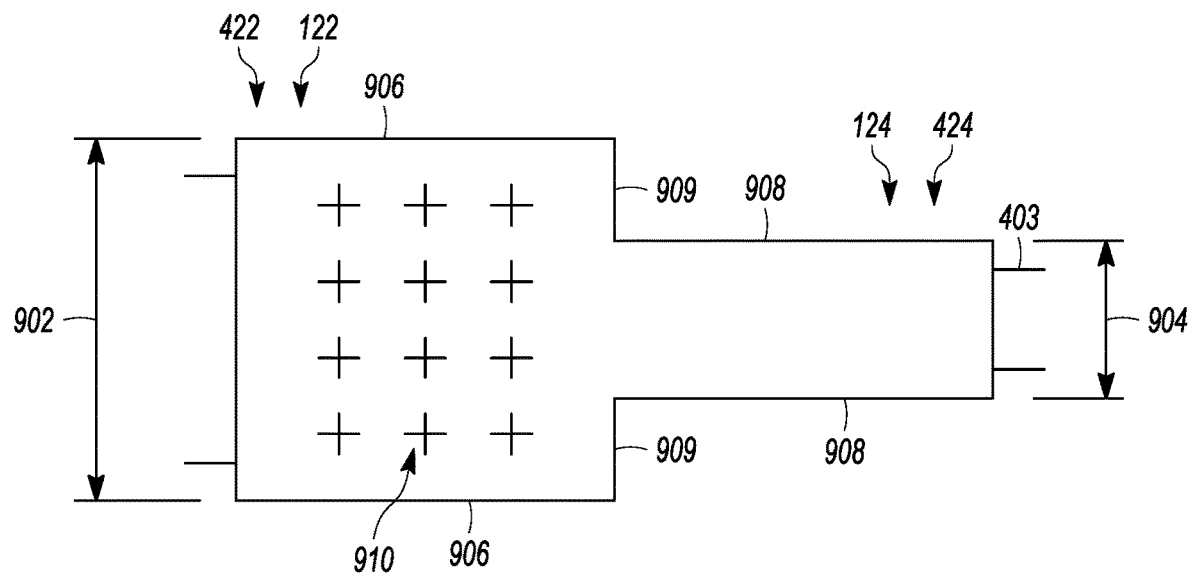
FIG. 9 provides a side view of another resistive plate.

Instead of tapered sides, stepped sides are used to achieve differently sized first and second plate ends in various embodiments. FIG. 9 depicts an example resistive plate including stepped surfaces. As with the example of FIGS. 6-8, the first plate end 422 has a first width 902, and the second plate end 424 has a second width 904 that is smaller than the first width 902. Accordingly, the second portion has increased resistance relative to the first portion. Further, the second portion may be positioned in a location of greater airflow relative to the first portion, and an increased amount of power or heat can be redistributed toward the second portion relative to a design in which both plate ends are evenly sized. However, the example resistive plate of FIG. 9 does not use tapered sides. Instead, the depicted resistive plate has first straight sides 906 that extend from the first plate end 422, and second straight sides 908 that extend from the second plate end 424. Corresponding stepped surfaces 909 join the first straight sides 906 and second straight sides 908. The stepped surface 909 may be perpendicular to the straight sides (and, accordingly, about parallel to the plate ends).

The example resistive plate of FIG. 9 also includes raised features 910 that extend upward from the surface of the resistive plate proximate the first plate end 422, or on the first portion 122. The raised features 910 may be used to further help provide desired heat or power redistribution, and/or improve cooling of the surface.

Figure 18:
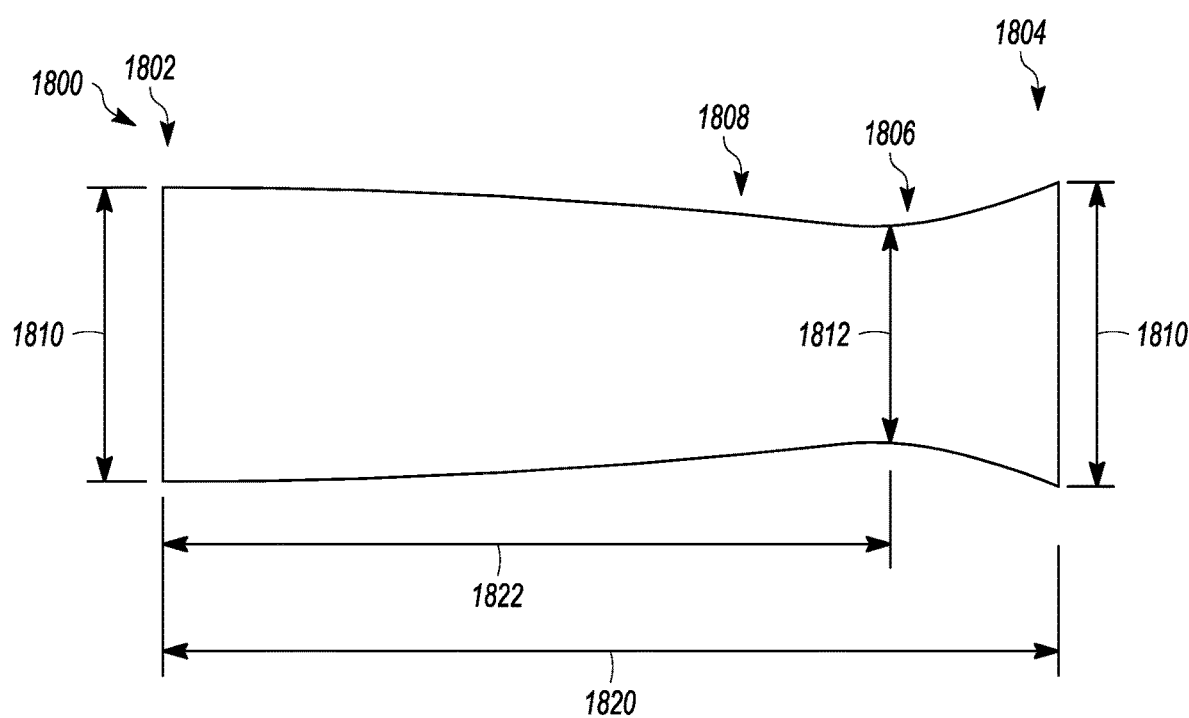
FIG. 18 provides a side view of a resistive plate.

In some examples, a resistive element may taper from a larger width at the ends to a smaller width at an internal location, which may be referred to herein as having a notched profile. FIG. 18 provides a side view of a resistive element 1800 that has a notched design. The resistive element depicted in FIG. 18 has a first end 1802 that is configured to be positioned proximate an inner radius of a resistive grid, and a second end 1804 that is configured to be positioned proximate to an outer radius of the resistive grid.

As seen in FIG. 18, the depicted example resistive element has a maximum width 1810 at each end, and a minimum width 1812 at an internal location 1806, thereby defining a notched portion 1808 having a reduction in width. Such a design, for example, may help to move heat generated away from the ends to protect insulative mounting material and/or to direct heat to an internal location with greater available airflow. In various examples, a reduction in area of between about 10% and about 30% relative to a rectangular or un-notched design may be provided. In the illustrated example of FIG. 18, each end has the same width; however, in other examples the ends may have different widths. For example, the width at one end may be smaller than the width at the other end, but larger than the minimum width at the internal location. Further, the depicted example shows a smooth curved transition between the widths. In other examples, however, linear, stepped, or non-smooth transitions may be employed.

By way of example and not limitation, in various examples the maximum width of the resistive element of FIG. 18 may be between 2.0 inches and 3.5 inches (e.g., 2.88 inches, with a minimum width of 2.2 inches). The thickness may be between 0.040 inches and 0.070 inches (e.g., 0.050 inches). The thickness may be constant in some examples, or may vary as discussed herein. The illustrated example also has a length 1820, and a distance 1822 from the first end to the location of minimum width. For instance, in some examples, the location of minimum width is located between 70% and 92% of the overall length from the first end. By way of example, the overall length may be between 9 inches and 14 inches (e.g., 11.75 inches). It should be noted that the above example dimensions are provided by way of illustration and not limitation, as other dimensions may be employed in other examples. The particular size and shape of the resistive element may be determined based on factors including the amount of heat to be dissipated, the material used for the resistive element, the material used for insulative mounting, and/or the availability of air flow (e.g., the amount and distribution of available air flow for cooling).

Additionally or alternatively, spacing between resistive elements or aspects thereof may be controlled to provide further control of heat or power dissipation. For example, FIG. 10 depicts an example resistive grid in which resistive elements (or portions thereof are) are uniformly or evenly spaced. In the example of FIG. 10, the resistive element is formed as a continuous ribbon 126 that extends between connection points 1012 on the inner radius and connection points 1022 on the outer radius. The connection points are evenly spaced along the corresponding radii, and all connection points are utilized by the continuous ribbon 126.

In the example of FIG. 11, however, the connection points utilized by the continuous ribbon 126 are unevenly spaced, resulting in unevenly spaced portions of the resistive element along the inner radius or first frame end. The uneven spaces may be used to provide larger areas for air circulation, while allowing use of a frame that has evenly spaced connection points (e.g., allowing for various embodiments to be used to modify and retro-fit existing installations). In the illustrated example, the connection points are evenly spaced similar to the example of FIG. 10, but the continuous ribbon 126 extends only between connection points 1012a on the inner radius and 1022a on the outer radius, and does not utilize connection points 1012b on the inner radius and 1022b on the outer radius. Accordingly, the depicted resistive grid has unevenly spaced portions of the resistive element along the first frame end (corresponding to the inner radius). For example, portion 1108 of the resistive element is spaced at a distance 1102 from portion 1110, but portion 1110 is spaced at a distance 1104 from portion 1112, with distance 1104 being twice that of distance 1102.

Different patterns of alternate use of connection points may be used. For example, in some embodiments, the continuous ribbon may skip every other attachment point. Or, as another example, the continuous ribbon may skip every third attachment point. As one more example, the skip pattern may vary and/or be randomized.

Figure 12:
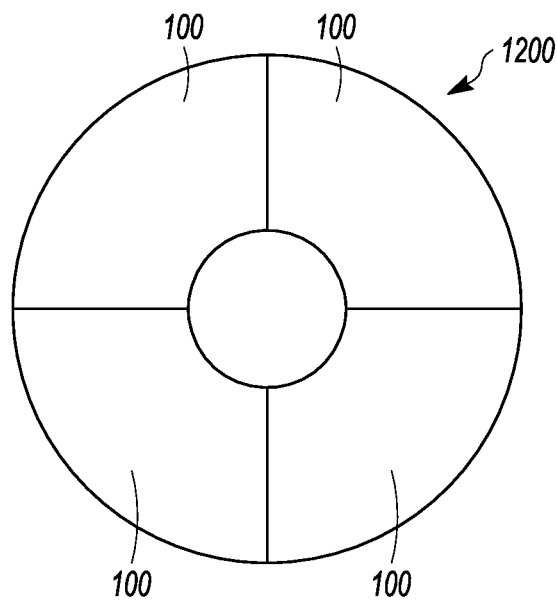
FIG. 12 provides a top view of a resistive grid system.
Figure 13:
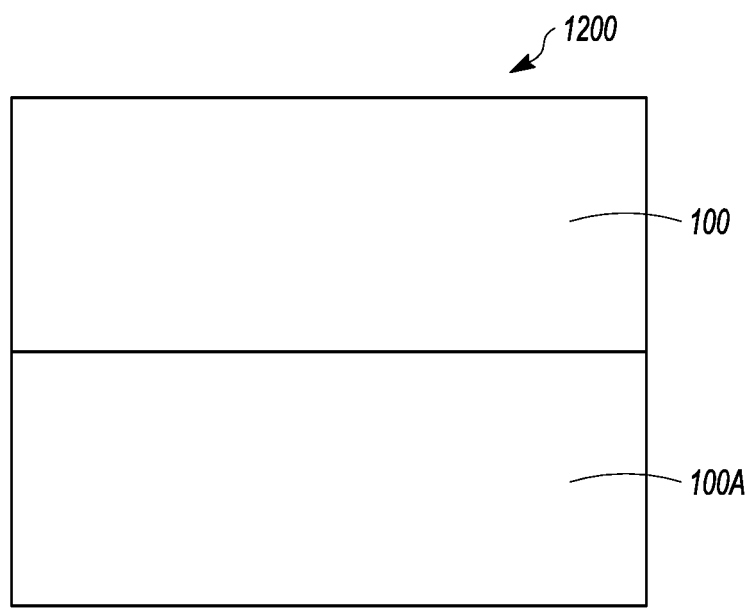
FIG. 13 provides a side view of the resistive grid system of FIG. 12.

Combinations of resistive grids may be used together to provide a resistive grid system. For example, FIG. 12 depicts an overhead view of an example resistive grid system 1200, and FIG. 13 depicts a side view of the example resistive grid system 1200 of FIG. 12. In the illustrated example, resistive grids are joined or placed laterally next to each other and also stacked on top of each other. For example, as seen in FIG. 12, four resistive grids are each individually formed defining 90 degree arcs, with the four resistive grids disposed next to each other to form a ring structure. Other quantities of resistive grids and corresponding angular lengths may be used in other examples. As one example, in some embodiments, six grids may be employed with each defining a 60 degree arc. As seen in FIG. 13, a resistive grid is stacked on top of a resistive grid 100a. Accordingly, various numbers of ring-like structures as seen in FIG. 12 may be stacked on top of each other. It may be noted that these stacks may be oriented differently in various embodiments. For example, in some embodiments the stacks may be oriented vertically (e.g., normal to the horizon), and in other embodiments the stacks may be oriented horizontally (e.g., parallel to the horizon). Accordingly, air may be exhausted from the stacks, for example, upwards, or as another example, to a side.

In some embodiments, the grids of different layers of a stack may be slightly different from each other. For example, with reference to FIGS. 11 and 13, the resistive grid on top of the stack of FIG. 13 may be arranged as shown in FIG. 11, with a resistive element coupled to connection points 1012a and 1022a (shown in solid lines for resistive element 126a of FIG. 11), but not utilizing connection points 1012b and 1022b. However, the resistive grid 100 a may utilize a different resistive element arrangement, utilizing connection points 1012b and 1022b (shown partially in phantom lines for resistive element 126b of FIG. 11), but not utilizing connection points 1012a and 1022a. The resistive elements 126a and 126b provide an example of resistive elements that are coupled to offset attachment points relative to each other. Such an arrangement in various embodiments provides for increased efficiency of airflow (e.g., between layers of a stacked arrangement).

Figure 14:
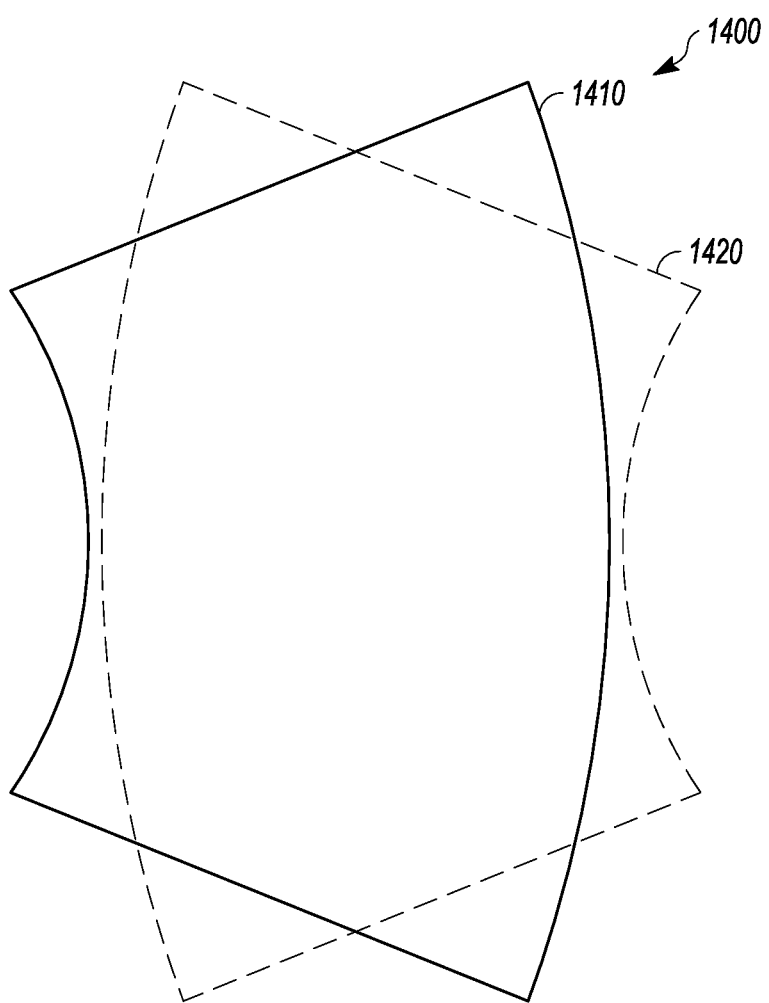
FIG. 14 provides a top view of a resistive grid system.

In some embodiments, layers of a stack may have a different shape or orientation than one or more adjacent layers of the stack. For example, FIG. 14 depicts a top view of a stack 1400 having a first frame 1410 (shown in solid lines) and a second frame 1420 (shown in phantom lines), with the second frame positioned on top of the first frame.

The first frame and second frame are positioned such that their corresponding radii are on opposite sides, which helps negate the abnormal pressure distribution resulting from flow over radial grids. In various embodiments, the resistive element density on the outside of one grid is matched to the resistive element density on the inside of an adjacent grid. Accordingly, different resistive elements will be used for the first frame relative to the second frame. The example of FIG. 14 helps change back pressure and thermal profile to even out airflow and thermal distribution. It may be noted that resistive element profiles for radial frames have higher element density nearer the center of the radius; however, most fans produce higher flow near the tip, which can help result in similar thermal profiles.

Figure 15:
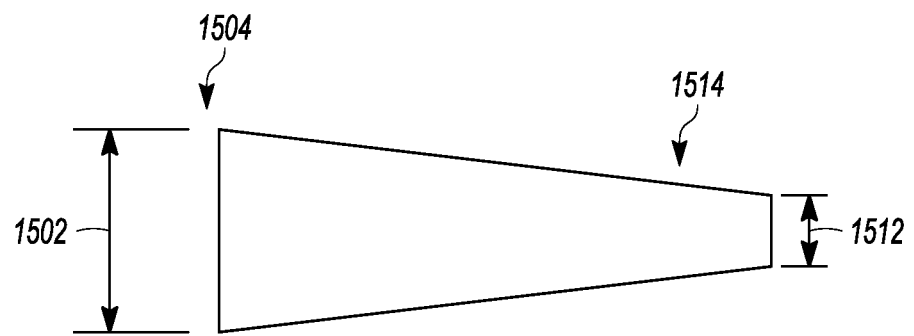
FIG. 15 provides a side view of a resistive plate.

Varying plate widths were discussed in connection with FIGS. 6-9. Additionally or alternatively, plate thicknesses may be varied to achieve different heat or power dissipation capabilities. For example, FIG. 15 depicts an example plate having a first thickness 1502 proximate a first end 1504 of the plate that is configured to be located near the first frame end. The plate also has a second thickness 1512 proximate a second end 1514 of the plate that is configured to be located near the second frame end. The first thickness 1502 is greater than the second thickness 1512, which results in higher resistance, and power, for the second frame end having the second thickness.

Figure 16:
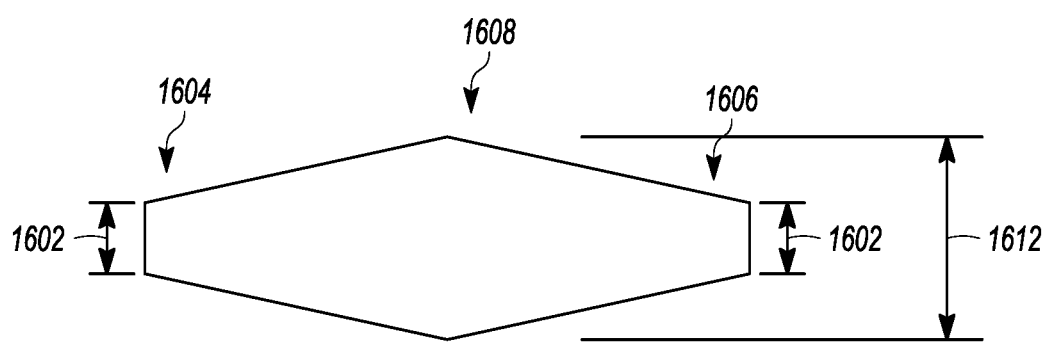
FIG. 16 provides a side view of another resistive plate.

As another example, FIG. 16 depicts an example plate having a first thickness 1602 proximate both the first end 1604 and second end 1606, and a second thickness 1612 that is larger than the first thickness 1602, with the second thickness 1612 disposed at a central portion 1608 of the plate. Accordingly, resistance, and power, is higher for the ends relative to the central portion.

In various embodiments, a variable stamping pattern used to produce an element (e.g., resistive element). While stamping patterns may be utilized to provide mechanical robustness and/or stiffness to desired locations of an element, the stamping patterns may additionally or alternatively be designed to influence airflow resistance and/or other cooling or heat dissipation characteristics. For example, the deeper a stamping is, the more airflow will be restricted or pinched off and forced to flow elsewhere.

For example, reducing the depth of the stamping in areas of low airflow can increase airflow in that area by lowering the resistance to airflow. As another example, conversely, increasing the depth of the stamping in areas of naturally excessive flow can increase resistance to airflow, thereby locally blocking or impeding airflow and forcing the air to flow elsewhere through the element array, and re-directing the flow to areas that may benefit from increased airflow. Accordingly, the depth of the stamping of an element may be used to advantageously direct airflow toward portions that may benefit from increased airflow and/or away from portions that may otherwise have excessive airflow.

Figure 17A:
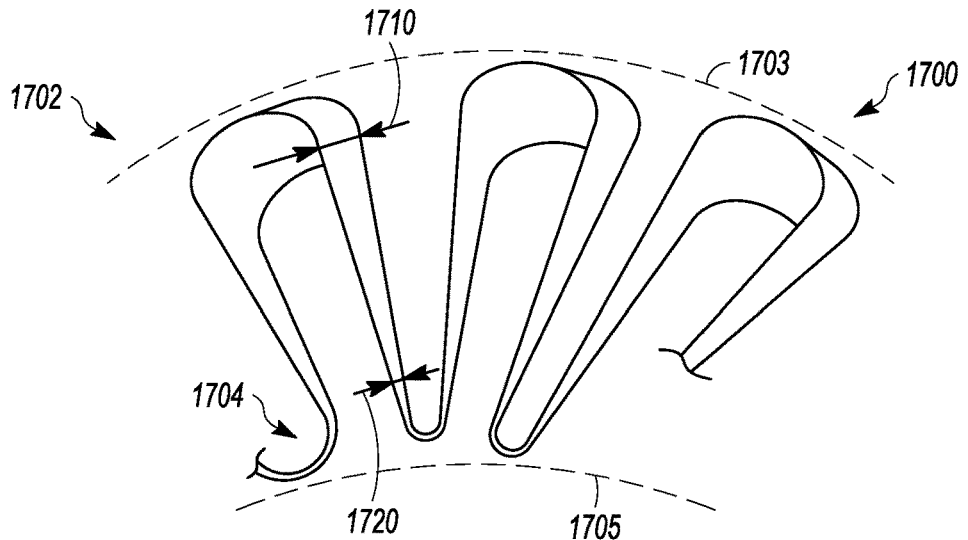
FIG. 17a provides a top perspective view of another resistive element.

For example, FIG. 17a illustrates an element 1700 having a first portion 1702 positioned along an outer diameter 1703 and a second portion 1704 positioned along an inner diameter 1705. The first portion has a relatively low element density (e.g., lower than the density for the second portion), and the second portion has a relatively high element density (e.g., higher than the density for the first portion). In the example depicted in FIG. 17, the element has variable stamping, with the first portion having a first stamping depth 1710 that is greater than a second stamping depth 1720 of the second portion. Accordingly, airflow may be directed from the first portion having the lower element density toward the second portion having the higher element density, to help balance the airflow between the two portions or otherwise improve airflow to the second portion.

Figure 17B:
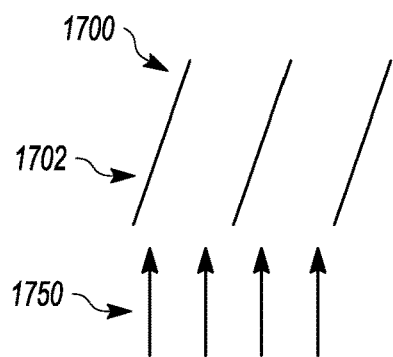
Figure 17C:
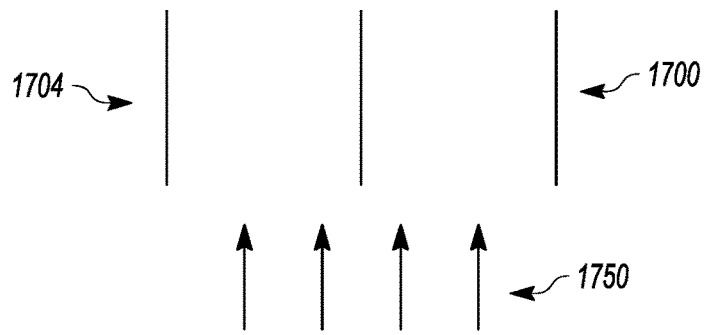

In various embodiments, additionally or alternatively, the element of FIG. 17a may comprise variable offset relative to airflow. For example, the offset of the element relative to airflow at the first portion may be different than the offset of the element relative to airflow at the second portion. For instance, for the illustrated example, FIG. 17b schematically depicts the offset of the first portion, and FIG. 17c depicts the offset of the second portion. As seen in FIG. 17b, at or near the outer diameter for the illustrated example, the element is oriented at an angle to the airflow 1750. However, in FIG. 17c, at or near the inner diameter, the element is oriented parallel to the airflow. Accordingly, airflow at the outer diameter is partially restricted and re-directed toward the inner diameter.

It may be noted that the particular angle or amount of offset may be varied in different embodiments, and that the particular orientations shown in connection with FIG. 17 are provided by way of example and not limitation. It may be noted that angular offset with respect to airflow may be adjusted to better capture air leaving a fan blade with angular velocity, and also to increase the Reynold's number for improved heat transfer. It may be further noted that in various examples there may be a tradeoff between increased angular offset (which may create restrictions that reduce airflow and decrease cooling performance) and decreased angular offset (which may create locally low airflow restriction, higher airflow velocities, and increased heat transfer performance).

In accordance with one example or aspect, a resistive grid may include a frame and at least one resistive element. The frame may have a first frame end and a second frame end opposite the first frame end. The first frame end and the second frame end may be joined by frame sides. The at least one resistive element may extend between the first frame end and the second frame end. The at least one resistive element may have a first portion and a second portion. The first portion may be configured to have one or both of decreased heat generation or decreased electrical resistance relative to the second portion.

Optionally, the second portion may be configured to have increased air flow relative to the first portion.

Optionally, the first frame end may have a first length that is shorter than a second length of the second frame end, with the first portion proximate the first frame end, and the second portion proximate the second frame end. For example, the first frame end may define an inner radius and the second frame end may define an outer radius.

Optionally, the at least one resistive element may include a plurality of individual resistive plates. In some examples, the resistive plates include openings passing through the resistive plates.

Optionally, the frame may define attachment points along the first frame end, and the at least one resistive element may be connected to alternating attachment points.

Optionally, the at least one resistive element may include unevenly spaced portions along the first frame end.

Optionally, the at least one resistive element may include a stamping pattern having a variable depth.

Optionally the at least one resistive element may have variable offset relative to airflow.

In accordance with one example or aspect, a resistive grid may include a frame and a plurality of resistive plates. The frame may have a first frame end and a second frame end opposite the first frame end. The first frame end and the second frame end may be joined by frame sides. The first frame end may have a first length that is shorter than a second length of the second frame end. The plurality of resistive plates may extend between the first frame end and the second frame end. The resistive plates may have a first plate end proximate to the first frame end, and a second plate end proximate to the second frame end. The first plate end may be configured to have one or both of decreased heat generation or decreased electrical resistance relative to the second plate end.

Optionally, the resistive plates may have openings passing therethrough.

Optionally, the first plate end may define a first width, and the second plate end may define a second width, with the first width greater than the second width.

Optionally, the resistive plates may include tapered sides extending between the first plate end and the second plate end.

Optionally, the resistive plates may include slots passing through the first plate portion.

Optionally, the resistive plates may include raised features disposed on the first plate portion.

In accordance with one example or aspect, a resistive grid system may include a first resistive grid that includes a first frame and at least one first resistive element. The first frame may have a first frame end and a second frame end opposite the first frame end. The first frame end and the second frame end may be joined by frame sides. The first frame end may have a first length that is shorter than a second length of the second frame end. The at least one first resistive element may extend between the first frame end and the second frame end. The at least one first resistive element may have a first portion proximate the first frame end, and a second portion proximate the second frame end. The at least one first resistive element may define portions that are unevenly spaced along the first frame end.

Optionally, the resistive grid system may include a second resistive grid that includes a second frame aligned with the first frame. The second resistive grid may include at least one second resistive element that is offset from the at least one first resistive element along the first frame end.

Optionally, the first frame may include first attachment points along the first frame end, and the at least one first resistive element may be connected to alternating first attachment points. Additionally, the resistive grid system may include a second resistive grid comprising a second frame aligned with the first frame, and second attachment points aligned with the first attachment points. The second resistive grid may include at least one second resistive element that is coupled to offset attachment points relative to the at least one first resistive element.

The various examples used herein are provided by way of illustration, and are not exhaustive. For example, aspects of various embodiments (e.g., spacing, plate widths, plate thickness, holes, features) designed to redistribute heat or power may be combined with aspects of other embodiments to provide a desired redistribution of power or heat. The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A resistive grid comprising:
   a frame having a first frame end and a second frame end opposite the first frame end, the first frame end and the second frame end are joined by frame sides; and
   at least one resistive element extending between the first frame end and the second frame end, the at least one resistive element having a first portion and a second portion, wherein the first portion is configured to have one or both of decreased heat generation or decreased electrical resistance relative to the second portion.

2. The resistive grid of claim 1, wherein the second portion is configured to have increased air flow relative to the first portion.

3. The resistive grid of claim 1, wherein the first frame end has a first length that is shorter than a second length of the second frame end, the first portion is proximate the first frame end, and the second portion is proximate the second frame end.

4. The resistive grid of claim 3, wherein the first frame end defines an inner radius and the second frame end defines an outer radius.

5. The resistive grid of claim 1, wherein the at least one resistive element comprises a plurality of individual resistive plates.

6. The resistive grid of claim 5, wherein the resistive plates comprise openings passing through the resistive plates.

7. The resistive grid of claim 1, wherein the frame defines attachment points along the first frame end, and wherein the at least one resistive element is connected to alternating attachment points.

8. The resistive grid of claim 1, wherein the at least one resistive element comprises unevenly spaced portions along the first frame end.

9. The resistive grid of claim 1, wherein the at least one resistive element comprises a stamping pattern having a variable depth.

10. The resistive grid of claim 1, wherein the at least one resistive element comprises variable offset relative to airflow.

11. A resistive grid comprising:
    a frame having a first frame end and a second frame end opposite the first frame end, the first frame end and the second frame end are joined by frame sides, the first frame end having a first length that is shorter than a second length of the second frame end; and a plurality of resistive plates extending between the first frame end and the second frame end, the resistive plates having a first plate end proximate to the first frame end, and a second plate end proximate to the second frame end, the resistive plates having a first plate portion proximate the first plate end and a second plate portion proximate the second plate end, wherein the first plate portion is configured to have one or both of decreased heat generation or decreased electrical resistance relative to the second plate portion.

12. The resistive grid of claim 11, wherein the resistive plates have openings passing therethrough.

13. The resistive grid of claim 11, wherein the first plate end defines a first width, and the second plate end defines a second width, and the first width is greater than the second width.

14. The resistive grid of claim 13, wherein the resistive plates comprise tapered sides extending between the first plate end and the second plate end.

15. The resistive grid of claim 13, wherein the resistive plates comprise slots passing through the first plate portion.

16. The resistive grid of claim 13, wherein the resistive plates comprise raised features disposed on the first plate portion.

17. A resistive grid system comprising:
a first resistive grid comprising:
a first frame having a first frame end and a second frame end opposite the first frame end, the first frame end and the second frame end are joined by frame sides, the first frame end having a first length that is shorter than a second length of the second frame end; and
at least one first resistive element extending between the first frame end and the second frame end, the at least one first resistive element having a first portion proximate the first frame end, and a second portion proximate the second frame end, wherein the at least one first resistive element defines portions that are unevenly spaced along the first frame end; and
a second resistive grid comprising:
a second frame aligned with the first frame, and second attachment points aligned with the first attachment points; and
at least one second resistive element that is coupled to offset attachment points relative to the at least one first resistive element,
wherein the first frame comprises first attachment points along the first frame end, and
wherein the at least one first resistive element is connected to alternating first attachment points.

18. The resistive grid system of claim 17, further comprising a second resistive grid comprising a second frame aligned with the first frame, the second resistive grid comprising at least one second resistive element that is offset from the at least one first resistive element along the first frame end.

* * * * *